(12) United States Patent
Toncelli (10) Patent No.: US 11,045,973 B2
(45) Date of Patent: Jun. 29, 2021

(54) APPARATUS FOR MANUFACTURING SLABS WITH VEINED EFFECT

(71) Applicant: Luca Toncelli, Bassano del Grappa (IT)

(72) Inventor: Luca Toncelli, Bassano del Grappa (IT)

( * ) Notice: Subject to any disclaimer, the term of this patent is extended or adjusted under 35 U.S.C. 154(b) by 448 days.

(21) Appl. No.: 14/868,920

(22) Filed: Sep. 29, 2015

(65) Prior Publication Data
US 2016/0016328 A1 Jan. 21, 2016

Related U.S. Application Data

(63) Continuation of application No. 12/669,121, filed as application No. PCT/EP2008/058682 on Jul. 4, 2008, now Pat. No. 9,174,358.

(30) Foreign Application Priority Data

Jul. 16, 2007 (IT) .......................... TV2007A000126

(51) Int. Cl.
*B28B 1/00* (2006.01)
*B28B 1/08* (2006.01)
(Continued)

(52) U.S. Cl.
CPC .............. *B28B 1/005* (2013.01); *B28B 1/082* (2013.01); *B28B 13/0215* (2013.01); *B29C 67/244* (2013.01)

(58) Field of Classification Search
CPC ...... B28B 1/005; B28B 1/082; B28B 13/0215
See application file for complete search history.

(56) References Cited

U.S. PATENT DOCUMENTS

| 1,448,203 A | 3/1923 | Cumfer et al. |
| 1,829,187 A * | 10/1931 | Piessevaux ............... D21J 1/00 162/119 |

(Continued)

FOREIGN PATENT DOCUMENTS

| CN | 1522987 A | 8/2004 |
| CN | 2784164 Y | 5/2006 |

(Continued)

OTHER PUBLICATIONS

Abdullah, Mohd Mustafa Al Bakri, et al. "Concrete Ceramic Waste Slab (CCWS)." Journal of Engineering Research and Ed Journal of Engineering Research and Education, (2006) vol. 3, pp. 139-145; available at http://dspace.unimap.edu.my/dspace/handle/123456789/2032.

(Continued)

*Primary Examiner* — Joseph S Del Sole
*Assistant Examiner* — Jerzi H Moreno Hernandez
(74) *Attorney, Agent, or Firm* — Fredrikson & Byron, P.A.

(57) ABSTRACT

During the manufacture of slabs with a veined effect a liquid or powder colouring agent is deposited on the surface of a thin layer of starting mixture by means of at least one dispensing device and the resultant mixture is supplied, falling freely, from one end of an extractor belt forming the bottom of a mixture metering/distributor unit, following which the mixture is transferred, falling freely, onto a temporary moulding support. This results in the production of slabs provided with veining extending through the entire thickness of the slabs and also visible along the whole edge of the slab, even after it has been machined.

18 Claims, 5 Drawing Sheets

(51) Int. Cl.
   *B28B 13/02* (2006.01)
   *B29C 67/24* (2006.01)

(56) References Cited

U.S. PATENT DOCUMENTS

| | | | |
|---|---|---|---|
| 2,098,246 A | 11/1937 | Jarrier | |
| 2,200,773 A | 5/1940 | Finne | |
| 2,323,864 A | 7/1943 | Weyandt | |
| 3,426,730 A | 2/1969 | Lawson et al. | |
| 3,663,137 A | 5/1972 | Haas et al. | |
| 3,809,516 A * | 5/1974 | Komaki | B28B 1/005 |
| | | | 425/150 |
| 3,953,623 A | 4/1976 | Das | |
| 4,204,820 A | 5/1980 | Toncelli | |
| 4,557,882 A | 12/1985 | Arnold | |
| 4,569,920 A | 2/1986 | Smith-Johannsen | |
| 4,617,060 A | 10/1986 | Dreibelbis | |
| 4,698,010 A | 10/1987 | Toncelli | |
| 4,783,435 A | 11/1988 | Dreibelbis | |
| 4,937,394 A | 6/1990 | Dreibelbis | |
| 5,013,523 A | 5/1991 | Hata et al. | |
| 5,031,546 A | 7/1991 | Amos et al. | |
| 5,174,823 A | 12/1992 | Dario | |
| 5,264,168 A | 11/1993 | Toncelli et al. | |
| 5,314,090 A | 5/1994 | Alexander | |
| 5,469,971 A | 11/1995 | Chilton et al. | |
| 5,477,307 A | 12/1995 | Bergen et al. | |
| 5,514,399 A | 5/1996 | Cordera et al. | |
| 5,820,802 A | 10/1998 | Oberoi | |
| 5,914,187 A | 6/1999 | Naruse et al. | |
| 5,922,254 A | 7/1999 | Ebert et al. | |
| 5,942,205 A | 8/1999 | Murata et al. | |
| 6,355,191 B1 * | 3/2002 | Toncelli | B28B 7/44 |
| | | | 264/40.4 |
| 6,387,307 B1 | 5/2002 | Bossetti | |
| 6,461,552 B1 | 10/2002 | Geiger | |
| 6,713,015 B1 | 3/2004 | Toncelli | |
| 7,487,892 B1 | 2/2009 | Hirsch | |
| 7,550,026 B2 | 6/2009 | Hayakawa | |
| 7,550,106 B2 | 6/2009 | Toncelli | |
| 7,819,346 B2 | 10/2010 | Perkes | |
| 2004/0032044 A1 | 2/2004 | Toncelli | |
| 2004/0121082 A1 * | 6/2004 | Dunnous | B28B 11/001 |
| | | | 427/426 |
| 2005/0122833 A1 * | 6/2005 | Bailey | B28C 5/365 |
| | | | 366/3 |
| 2005/0147806 A1 | 7/2005 | Toncelli | |
| 2005/0238752 A1 | 10/2005 | Toncelli | |
| 2008/0079185 A1 | 4/2008 | Jamrussamee et al. | |
| 2008/0187742 A1 | 8/2008 | Toncelli | |
| 2008/0280750 A1 | 11/2008 | Liu | |
| 2008/0315448 A1 * | 12/2008 | Cruz | B28B 1/005 |
| | | | 264/71 |
| 2009/0101790 A1 | 4/2009 | Toncelli | |
| 2010/0052225 A1 | 3/2010 | Toncelli | |
| 2010/0119722 A1 * | 5/2010 | Tarozzi | B28B 11/001 |
| | | | 427/424 |
| 2010/0197005 A1 | 8/2010 | Belouski et al. | |
| 2011/0003366 A1 | 1/2011 | Zeikus | |
| 2011/0318483 A1 | 12/2011 | Toncelli | |

FOREIGN PATENT DOCUMENTS

| | | | |
|---|---|---|---|
| EP | 378275 A2 | 7/1990 | |
| EP | 0962294 A2 | 12/1999 | |
| EP | 1510314 A2 | 3/2005 | |
| EP | 1787779 A2 | 5/2007 | |
| FR | 2485067 A1 * | 12/1981 | B29C 67/245 |
| GB | 2310161 A | 8/1997 | |
| IT | 1242777 B | 5/1994 | |
| IT | TV940091 | 1/1996 | |
| IT | 1293176 B1 | 2/1999 | |
| JP | S57194034 A | 11/1982 | |
| JP | S6443336 A | 2/1989 | |
| JP | 2002348722 A | 12/2002 | |
| RU | 2283818 A | 7/2006 | |
| WO | 9615888 A | 5/1996 | |
| WO | 9846543 A1 | 10/1998 | |
| WO | 0117741 A1 | 3/2001 | |
| WO | 2003027042 A2 | 4/2003 | |
| WO | 2004022295 | 3/2004 | |
| WO | 2004039547 A1 | 5/2004 | |
| WO | 2006045728 A1 | 5/2006 | |
| WO | 2006048438 A1 | 5/2006 | |
| WO | 2006122892 A1 | 11/2006 | |
| WO | 2007009860 A1 | 1/2007 | |
| WO | 2009010406 A2 | 1/2009 | |

OTHER PUBLICATIONS

International Preliminary Report on Patentability dated Sep. 16, 2009 for PCT/EP2008/058682, 11 pages.
International Search Report dated Feb. 3, 2009 for PCT/EP2008/058682, 4 pages.
International Search Report dated Mar. 17, 2009 for PCT/IB2008/050966, 3 pages.
International Search Report dated Jun. 11, 2010 for PCT/IB2008/050998, 4 pages.
Written Opinion dated Feb. 3, 2009 for PCT/EP2008/058682, 8 pages.
Written Opinion dated Mar. 17, 2009 for PCT/IB2008/050966, 4 pages.
Written Opinion dated Jun. 11, 2010 for PCT/IB2008/050998, 7 pages.

* cited by examiner

APPARATUS FOR MANUFACTURING SLABS WITH VEINED EFFECT

RELATED APPLICATIONS

This is a continuation of application Ser. No. 12/669,121 filed Jan. 14, 2010, which is a 35 U.S.C. 371 national stage filing from International Application No.PCT/EP2008/058682, filed Jul. 4, 2008, which claims priority to Italian Application No. TV2007A000126, filed Jul. 16, 2007, the teachings of which are incorporated herein by reference.

FIELD OF THE INVENTION

The present invention relates to the manufacture of conglomerate stone slabs obtained from mixtures consisting of granules of stone and/or stone-like material and a bonding agent, and more specifically to the manufacture of slabs of this type which have particular colouring effects, such as so-called veining, intended to imitate as closely as possible natural stone materials.

More specifically the invention relates to a method and an apparatus for producing the slabs in question. In the description which follows reference will be made to the production of slabs with a veined effect, it being understood that reference thereto is made solely by way of a non-limiting example.

BACKGROUND

For many years so-called Bretonstone slabs have been known, this name referring to a particular manufacturing technology which essentially envisages the preparation of one or more starting mixtures comprising granules of stone and/or stone-like material with a specific particle size distribution and a bonding agent which made be of an inorganic nature (such as cement) or a synthetic resin which can be hardened (by the action of heat and/or a catalyst).

The starting mixture is distributed in the form of a layer of predetermined thickness on a temporary moulding support (such as a conveyor belt or a tray mould) and then subjected, for a predefined period of time and under a vacuum of given intensity, to the action of a press while a vibratory movement of prechosen frequency is applied to the press ram.

The resultant rough-formed slab is then transferred to the hardening stage using procedures which depend on the nature of the bonding agent.

In the continuation of the present description reference to Bretonstone slabs and/or the Bretonstone method is understood as meaning slabs obtained with the method described above.

According to an already known method for manufacturing Bretonstone slabs with a veined effect, after the step involving deposition of the starting mixture on the temporary support, colouring agent is distributed in an irregular manner on the surface of the layer of mixture and then the colouring agent is mixed up with the mixture using a spiked tool so that the colouring agent penetrates into the thickness of the mixture to a depth such that the finished slab, after the usual sizing and polishing operations, has veining similar to that of the natural stone from which the granules used in the mixture are obtained.

For further details regarding this method and the associated apparatus reference should be made to the patent IT-A-1,328,246 (corresponding to WO-A-03/027042) in the name of the same applicant, herein incorporated by reference.

This method is useful solely in the case where the finished slab must not be used such that its side edges are visible.

In fact, it has been found that, no matter how effectively mixing up of the colouring agent may be performed by means of the spiked tool, the colouring agent penetrates into the thickness of the mixture—and can therefore be seen in the finished slab—only over a section of a few millimetres, corresponding to not more than half the thickness of the finished slab.

There exist, however, certain uses of the finished slabs where the edge or side of the slab also remains visible (as, for example, in the case of so-called kitchen or bathroom tops) and, after polishing, the veining can be noted only in a thickness of a few millimetres from the top surface, while it is absent in the remainder of the edge or side to the detriment of the aesthetic characteristics of the slab laid.

According to an alternative solution, also known, for obtaining Bretonstone slabs with a veined effect, the mixture is distributed on the moulding support by means of a weighing type distributor unit with the characteristic features described in the patent IT-A-1,335,533 (corresponding to WO-A-2004/039547), herein incorporated by reference.

In this case, the starting mixture, before being loaded into the metering unit, is made to pass underneath devices which apply liquid or powder colouring or pigments agents onto its surface.

Since the mixture is loaded into the metering unit, falling freely, and then conveyed to the outlet for discharging onto the moulding support, it undergoes a certain degree of remixing which in turn results, on the one hand, in a substantial shortening of the veining and, on the other hand, in a not insignificant diffusion of the pigment in the mass of the mixture which is therefore at least partly coloured throughout the mass.

Another technology known for many years and aimed at the manufacture of slabs designed for internal and external cladding of buildings as well as the manufacture of articles similar to ceramic articles is one where granules of stone, stone-like or ceramic material, preferably in the form of sand, with a suitable particle size distribution, are mixed with the components normally used for the manufacture of ceramic materials, usually in powder form, and consisting mainly of clay or kaolin.

The resultant mixture is wetted with a bonding agent, which may be sodium silicate in aqueous form or a mixture of silicasol and polyvinyl alcohol.

With this starting mixture a layer of predetermined thickness is formed on a temporary support which is then subject to a vibrocompression step, resulting in a rough-formed slab.

The slab, after a drying step, in order to remove the water present in the mixture, undergoes a baking step at a high temperature (in the region of 1200° C.).

Below this technology, the associated method and the resultant slabs will be referred to by the generic name of "Lapitech".

This type of slab and technology is also affected by the same problem already mentioned with regard to the Bretonstone slabs.

BRIEF SUMMARY OF EMBODIMENTS OF THE INVENTION

It is therefore desirable to provide a method and a corresponding apparatus for manufacturing slabs of the Bretonstone or Lapitech type in which the slabs have coloured veining with a length comparable to that of standard natural stone and this veining is visible throughout the thickness and therefore along the entire edge of the finished slabs.

This object is achieved with a method for manufacturing slabs in which:

at least one starting mixture comprising at least one granular product comprising stone or stone-like or ceramic material with a specific particle size distribution and a hardening bonding agent is prepared;

said at least one mixture is loaded into a metering/distributor unit comprising:

a hopper with a top mouth for loading the mixture and a bottom opening for discharging the said mixture;

an extractor belt which forms the bottom wall of said hopper;

the mixture discharged from the bottom opening of said hopper is transferred by means of said extractor belt so that, falling freely from said belt, it is distributed in the form of a layer of predetermined thickness on a temporary moulding support positioned at a lower level than said extractor belt;

the layer of mixed formed on said temporary support is subjected to vibrocompression so as to obtain a rough-formed slab;

after a drying step, where applicable, said rough-formed slab is transferred into a hardening station, the method being characterized in that at least one colouring or pigmenting agent is distributed on the surface of the mixture being transferred by means of said extractor belt before the mixture is distributed, falling freely, onto said temporary moulding support.

Advantageously, the metering/distributor unit used in said method is that described and illustrated in Italian patent application No. TV 2004A000118 (corresponding to WO-A-2006/045728), herein incorporated by reference.

In the case where Bretonstone slabs are manufactured, the method according to the present invention envisages that: the bonding agent contained in the at least one starting mixture may be of an inorganic nature (such as cement) or a synthetic resin which can be hardened (by the action of heat and/or a catalyst); the layer formed on said temporary moulding support is subjected, for a predefined period of time and under a vacuum of given intensity, to the action of a press, while a vibratory movement of prechosen frequency is applied to the press ram; the resultant rough-formed slab is subjected to the hardening step using procedures which depend on the nature of the bonding agent.

In the case where Lapitech slabs are manufactured, where said starting mixture (as already mentioned) comprises, in addition to the granules of stone, stone-like or ceramic material with a prechosen particle size, in particular in the form of sand, also materials known per se for the manufacture of ceramic materials, such as clay and kaolin in powder form and an agent chosen from sodium silicate and silicasol together with polyvinyl alcohol, the rough-formed slab resulting from the vibrocompression step is subjected to a drying step and then a high-temperature baking step such that the clay or kaolin forms a bonding matrix for the abovementioned granules.

In the preferred embodiment of the invention said at least one colouring agent is distributed on the surface of the mixture in a non-uniform manner.

In turn the apparatus according to the invention is that described in the already cited Italian patent application No. TV2004A000118, except that it comprises as a characterizing aspect at least one device for dispensing colouring or pigmenting agent positioned at the downstream end of the extractor belt forming the bottom of the already mentioned hopper so as to dispense said colouring agent onto the surface of the layer of mixture transported by means of said extractor belt towards the position where it falls freely onto the said temporary moulding support.

It has been established that with the method and the apparatus according to the present invention the colouring agent is distributed randomly and not uniformly within the mass mixture, which falls into the temporary support producing the aforementioned veining which affects the entire thickness of the finished slab.

The colouring or pigmenting agent may be in solid form (preferably a dry powder) or liquid form and may be supplemented with or replaced by colouring or reflective granules which result in very attractive special effects in the finished product and throughout its thickness.

Considering now specifically the colouring agent dispensing device associated with the abovementioned apparatus, it may comprise a plurality of devices, namely one for each colouring agent, which are controlled independently of each other as regards the start and end of the dispensing operation, which may take place continuously or intermittently.

In the case where there is a plurality of dispensing devices, they may be mounted transversely with respect to the direction of feeding of the extractor belt which transports the layer of mixture discharged by the metering/distributor unit, so as to cover the entire width of the mixture layer.

Alternatively, it is possible to envisage a smaller number of dispensing devices mounted on a cross-member fixed at the top and transversely with respect to the extractor belt for the layer of mixture and movable along the said cross-member.

BRIEF DESCRIPTIONS OF DRAWINGS

The invention will now be described with regard to the accompanying drawings which show, by way of a non-limiting example, two variations of embodiment of the apparatus according to the invention.

More specifically.

DETAILED DESCRIPTION OF EMBODIMENTS OF THE INVENTION

Figure 1:
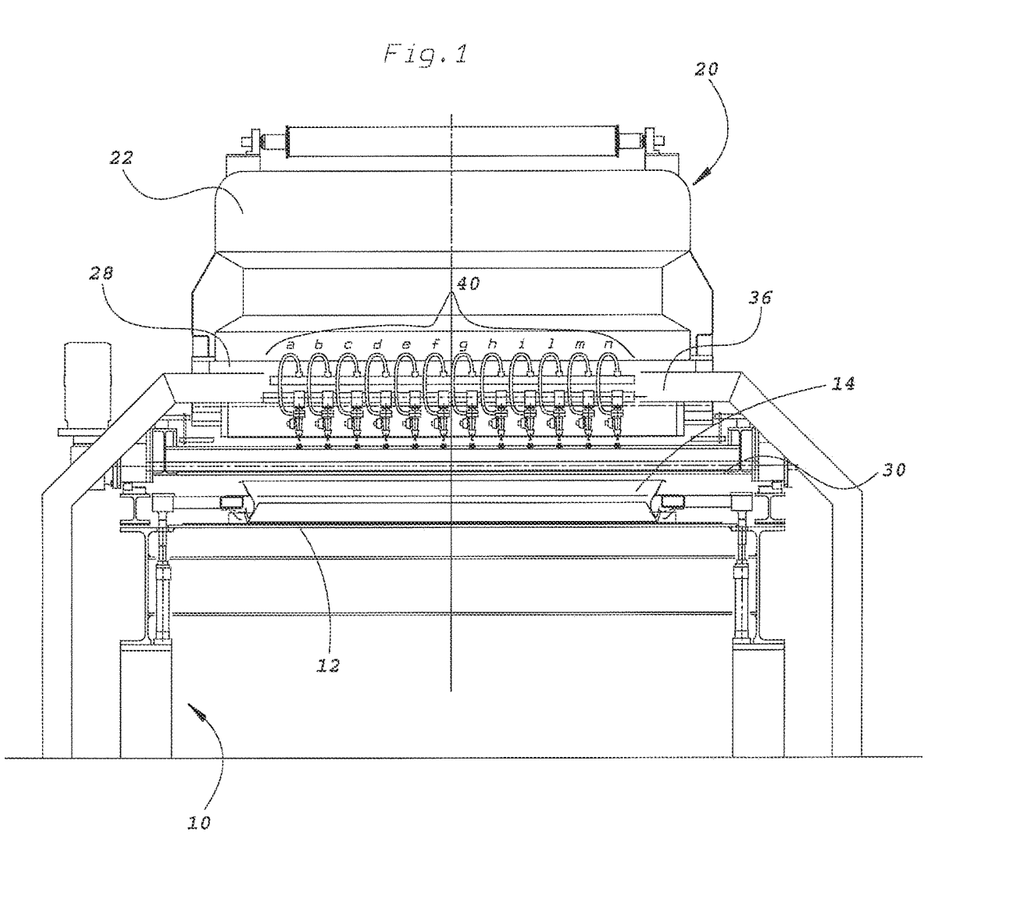
FIG. 1 is a front view of the apparatus provided with a plurality of units for dispensing colouring or pigmenting agents according to the invention.
Figure 2:
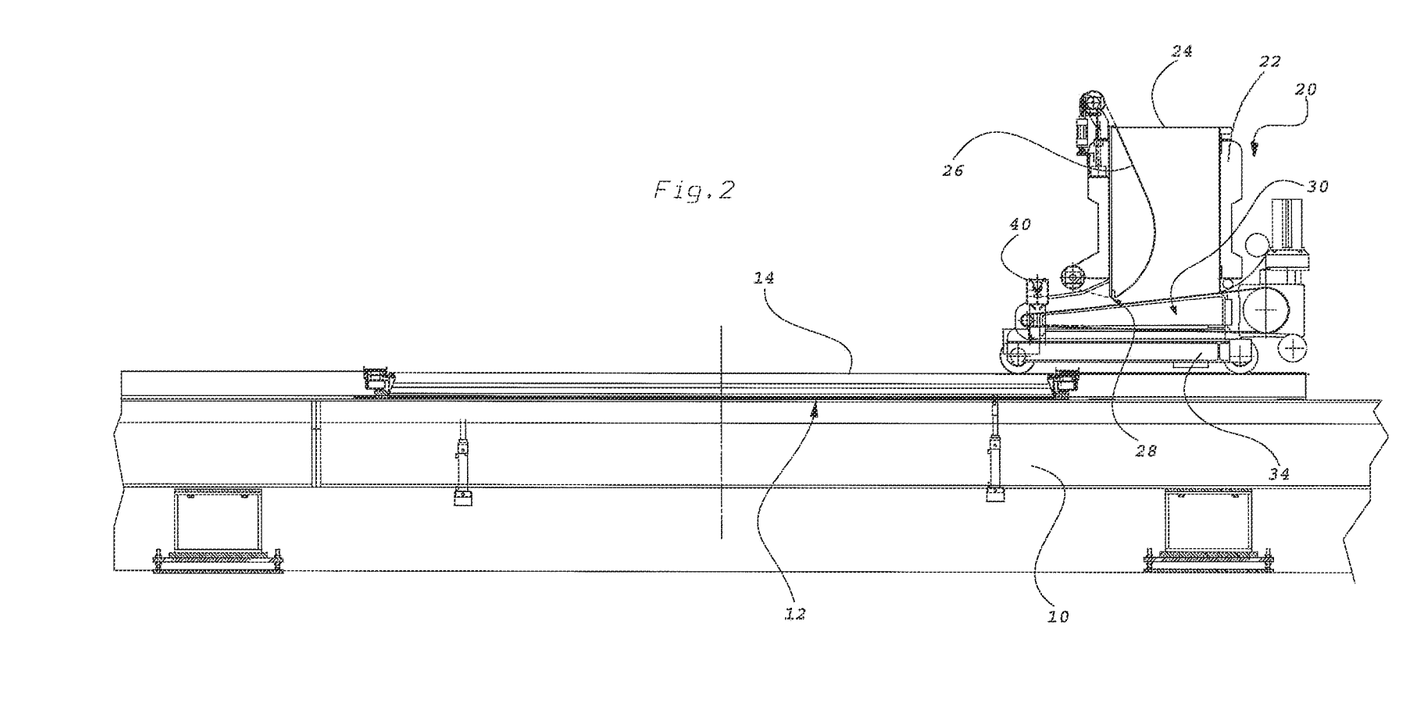
FIG. 2 is a partially sectioned side view of the apparatus according to FIG. 1.
Figure 3:
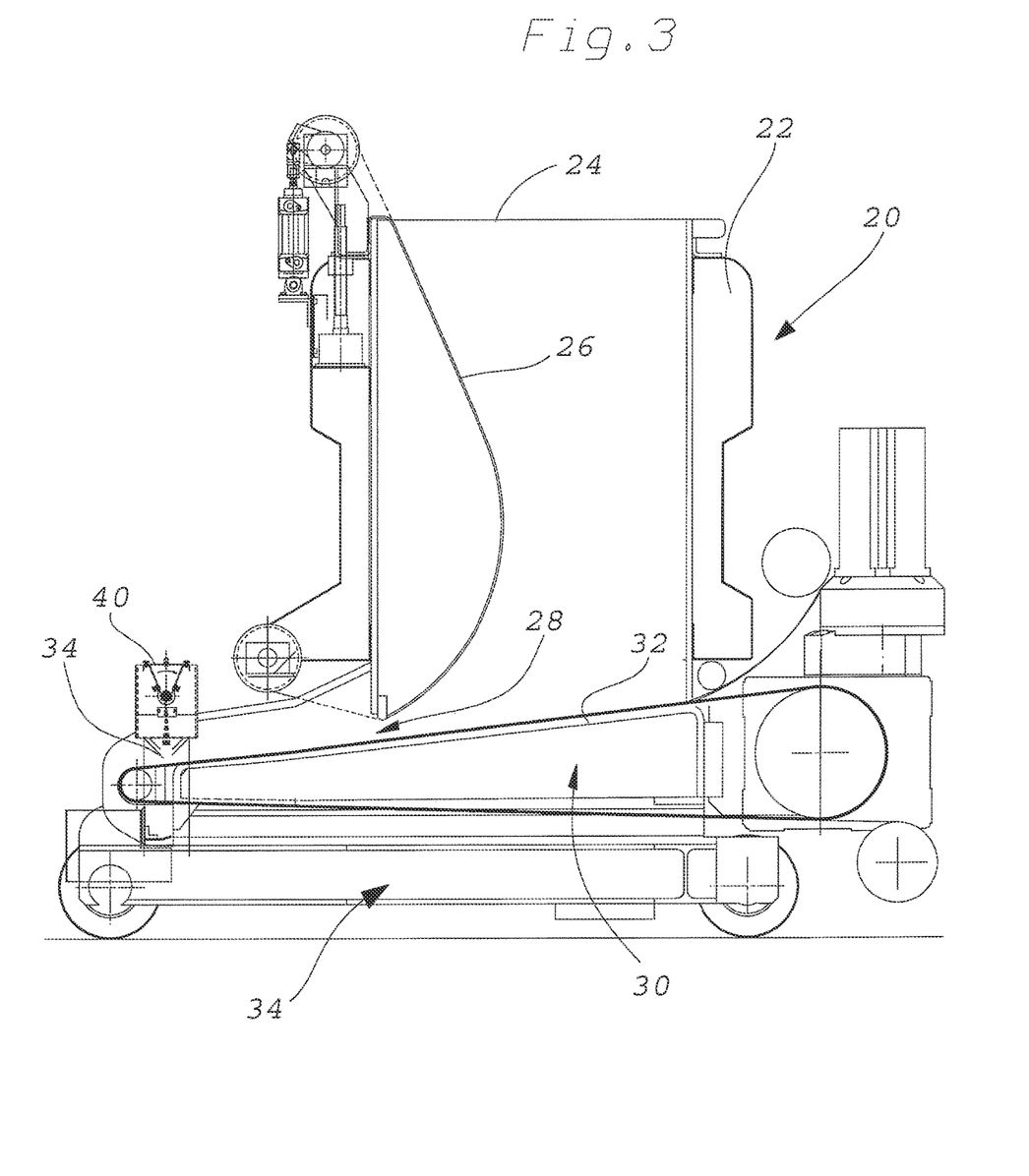
FIG. 3 is a side view of solely the mixture metering/distributor unit equipped with a device for dispensing colouring agent in powder form according to a first embodiment of the invention which is also visible in FIG. 2.

FIGS. 1 and 2 show an apparatus according to the present invention for distributing, in the form of a thin layer, on a support used in a plant for producing stone articles, a mixture based on agglomerate stone or ceramic material, to which colouring substances are added depending on the predetermined aesthetic effects.

In brief, the apparatus comprises a frame 10 which supports a surface 12 on which a temporary moulding support 14 is placed for each operating cycle, on which support a layer of mixture 18, supplied by a metering/distributor device denoted overall by the referenced above 20, is deposited in a free-falling manner.

The mixture distributor 20 in turn comprises a hopper 22 with a top mouth 24 for loading fresh mixture, a shaped or conveying wall 26 with a profile curved towards the inside of the hopper 22 and a mixture discharge opening 28 at the end of said shaped wall 26.

An extractor belt 30, positioned underneath said hopper 22, forms with its upper surface 30 the bottom of said hopper.

The belt 30 is used to convey and deposit a uniform layer of said mixture, after it has flowed inside the hopper 22 and passed out through said discharge opening 28, on said temporary support 14 which is positioned at a lower level than said extractor belt. At the same time a relative movement of said hopper 22 and said support 14 is maintained so that the layer of mixture distributed on said support is uniform.

In order to ensure the relative movement of hopper 22 and temporary support 14, the metering/distributor device 20 is mounted on a carriage denoted overall by the reference number 34 and movable by means of roller wheels parallel to the surface 12 of the apparatus.

From FIG. 1 it can be readily understood how the distribution and metering hopper 22, the extractor belt 30 as well as the mixture discharge opening 28 extend substantially over the entire width of the surface 12 so that the resultant product is a slab which has notable dimensions not only lengthwise but also transversely. In this connection it is worth noting that the slabs which can be obtained with this technology may have and in reality also have widths greater than 1.5 metres and lengths greater than 3.3 metres.

For further details regarding this apparatus reference should be made to the already mentioned Italian patent application No. TV2004A000118.

According to the invention, at least one device for dispensing colouring agent, denoted by the general reference number 40, is positioned at the downstream end of the extractor belt 30, preferably downstream of the discharge opening 28 of the hopper 22.

In this connection it should be noted that the colouring agent may be dispensed at any point on the upper surface 32 of the extractor belt 30, except for the zone immediately underneath the hopper 22.

Figure 4:
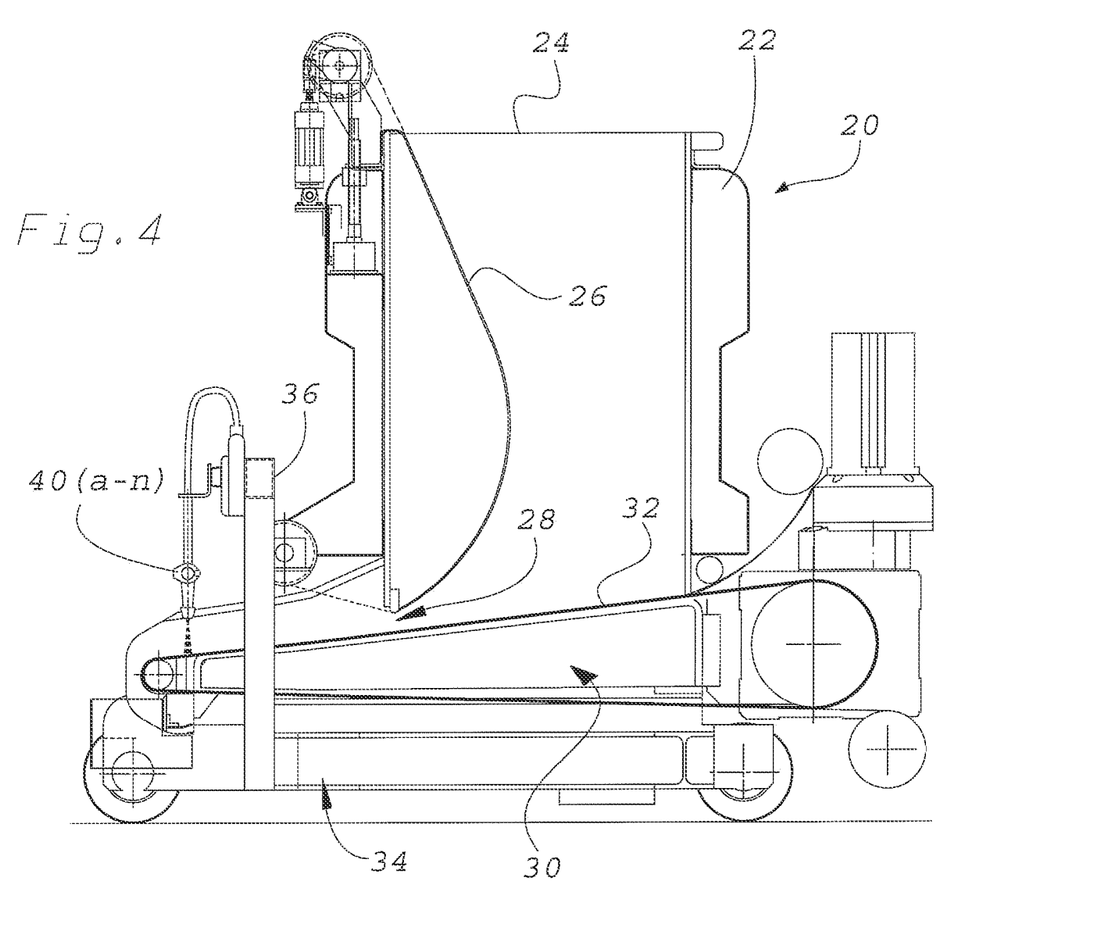
FIG. 4 is a view similar to that of FIG. 3 of a device for dispensing liquid colouring agent according to a second embodiment of the invention which is also visible in FIG. 1.

In particular, in accordance with the embodiment shown in FIGS. 1 and 4, at the downstream end zone of the extractor belt 30, the carriage 34 has, mounted thereon, a support structure comprising a cross-member 36 with, fixed thereto, a plurality of devices for dispensing colouring agent—denoted by the reference numbers 40 (a-m), respectively—each of which has a nozzle intended to emit a continuous or discontinuous jet of colouring agent (which, as ready mentioned, may be liquid or in the form of dry powder) which strikes a strip of the layer of mixture deposited on the tray mould, so as to cover overall the entire width of the mixture.

As regards the structure of the colouring agent dispensers, it is preferably that described in the aforementioned Italian patent application TV2004A000118 and illustrated in FIGS. 2 and 3 thereof.

The surface of the mixture, before leaving the extractor belt 30, is therefore sprinkled with colouring material in a manner which depends on the operating mode of the dispensing nozzle. In fact, if the dispensing nozzle is operated intermittently and at irregular time intervals, it is evident that the distribution of colouring agent on the surface of the mixture will not be homogeneous and pre-ordered.

Since the mixture with colouring agent is then transferred by means of a free-falling action onto the temporary moulding support and since the mixture when falling produces coloured lumps on the surface, the colouring agent, without uniformly colouring the mixture, is able to produce during the subsequent vibrocompression step colouring effects which affect the entire thickness of the manufactured article, similar to the veining of natural stones.

If, on the other hand, the mixture were to be uniformly coloured, the desired object would not be achieved, namely the formation of veining imitating that of standard natural stone.

At the same time, as demonstrated by experimental tests, the coloured zones affect the entire thickness of the mixture, so that the predefined object of the invention is fully achieved.

The variant shown in FIG. 4 proposes the alternative solution of mounting on the cross-member 36 an assembly with just a few colouring agent dispensing devices 38, said assembly 38 having, connected thereto, a drive system for controlled displacement thereof along the cross-member 36.

It is evident that a solution midway between those described above is possible, namely one where a smaller number of dispensing devices 40 are mounted on the cross-member 36, with the each of them designed so that it is movable along the cross-member over a limited distance, so as to ensure more correct distribution of colouring agent on the surface of the mixture which is transported by the upper surface 32 of the extractor belt 30 towards the temporary support 14.

Figure 5:
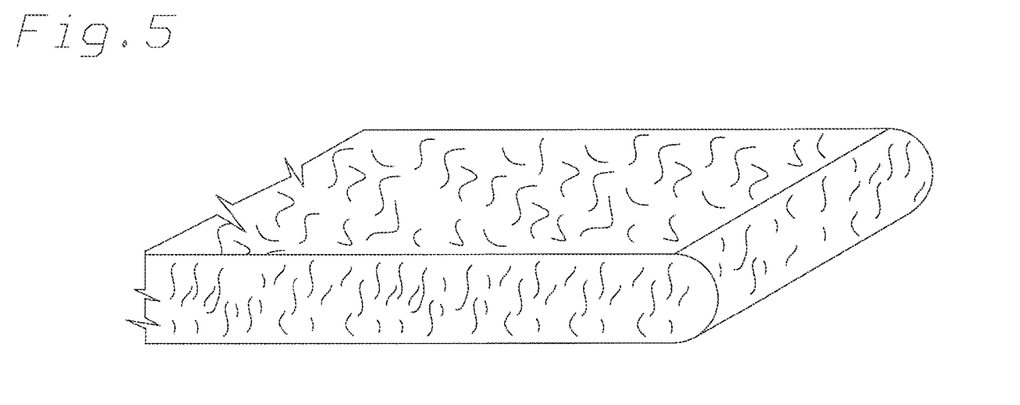
FIGS. 5 and 6 are axonometric views of products which can be obtained with the present invention.
Figure 6:
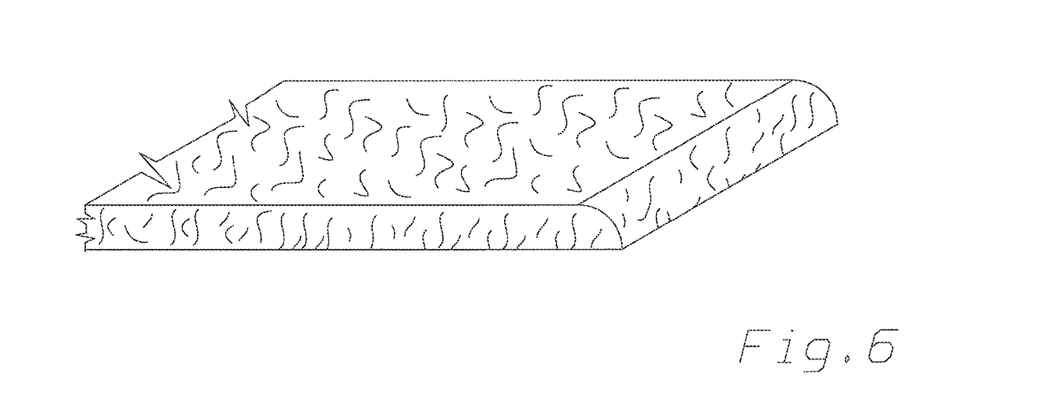

The product obtained fully satisfies the aforementioned requirements and has the appearance shown in FIGS. 5 and 6 (where it is possible to see a slab with a toroidal edge and a slab with a semi-toroidal edge, respectively, the veining being visible throughout the thickness of the slab and therefore also along its edges).

Finally, it should be noted that with the present invention a further advantage is achieved, mainly that of avoiding the need for any further operation on the mixture already deposited on the temporary support (for example using spiked tools) in order to ensure greater distribution of the colouring agent, with the obvious advantage in terms of simplification of the apparatus and the operating cycle.

It is understood that conceptually and mechanically equivalent modifications and variations are possible and may be envisaged without departing from the scope of the present invention as defined in the accompanying claims.

The invention claimed is:

1. An apparatus for producing slabs having a veined effect imitating that of standard natural stone, the apparatus comprising:
   a temporary support;
   a mixture metering/distributor unit comprising a hopper and an extractor belt, the hopper including a top mouth for loading a mixture into the hopper and a bottom opening for discharging the loaded mixture, a portion of the extractor belt being positioned beneath the hopper and having an upper surface that forms a bottom of the hopper in proximity to the bottom opening of the hopper, the extractor belt configured to transport the discharged mixture downstream from the bottom opening to a position beneath a plurality of coloring agent dispensing devices and then to an end zone at which the mixture freely falls from the extractor belt onto the temporary support;

said plurality of coloring agent dispensing devices positioned above the extractor belt, in proximity to the end zone, so as to dispense at least one coloring or pigmenting agent in a non-uniform distribution onto a surface of the mixture when transported downstream by the extractor belt to the position beneath the plurality of coloring agent dispensing devices;
    wherein by free fall from the extractor belt onto said temporary support, the mixture is distributed in the form of a rough-formed slab with a layer having a predetermined thickness and resulting in the veining effect penetrating over an entirety of the predetermined thickness of the slab;
a support structure comprising a cross-member to which the plurality of coloring agent dispensing devices is fixed, each coloring agent dispensing device in said plurality of coloring agent dispensing devices having a nozzle for emitting a continuous or discontinuous jet of coloring agent to strike a strip of the mixture as the mixture is transported by the extractor belt so as to cover overall an entire width of the mixture; and
a means configured for creating a relative movement between said extractor belt and said temporary support, wherein the relative movement between said extractor belt and said temporary support results in uniform freefalling of the mixture across the entire width onto said temporary support, the mixture metering/distributor unit being open to the external environment and such open condition being continuous for the mixture metering/distributor unit.

2. The apparatus according to claim 1, wherein the hopper further includes a shaped or conveying wall that extends toward the bottom opening of the hopper and has a profile that curves towards an inside of the hopper.

3. The apparatus according to claim 1, wherein each coloring agent dispensing device in the plurality of coloring agent dispensing devices is independently controlled.

4. The apparatus according to claim 1, wherein the plurality of coloring agent dispensing devices is aligned transversely with respect to a direction in which the extractor belt transports the mixture.

5. The apparatus according to claim 1, wherein the support structure is positioned relative to the mixture metering/distributor unit such that transport of the mixture via the extractor belt is over said support structure.

6. The apparatus according to claim 1, wherein at least one coloring agent dispensing device in the plurality of coloring agent dispensing devices is movable along the cross-member in a controlled and adjustable manner.

7. The apparatus according to claim 1, wherein the plurality of coloring agent dispensing devices is arranged along the transverse extent of the cross-member.

8. The apparatus according to claim 7, wherein each coloring agent dispensing device in the plurality of coloring agent dispensing devices is movable along the extent of the cross-member over a limited distance, so as to ensure more correct distribution of the at least one coloring or pigmenting agent onto the surface of the mixture that is being transported downstream by the extractor belt.

9. The apparatus according to claim 1, wherein each coloring agent dispensing device in the plurality of coloring agent dispensing devices is open to the external environment and such open condition is continuous.

10. The apparatus according to claim 9, wherein the rough-formed slab has an order of thickness less than an order of either length or width of the slab.

11. The apparatus according to claim 1, wherein the at least one coloring or pigmenting agent is comprised of a solid or liquid form.

12. An apparatus for producing slabs having a veined effect imitating that of standard natural stone, the apparatus comprising:
    a temporary support;
    a mixture metering/distributor unit comprising a hopper and an extractor belt, the hopper including a top mouth for loading a mixture into the hopper and a bottom opening for discharging the loaded mixture, a portion of the extractor belt being positioned beneath the hopper and having an upper surface that forms a bottom of the hopper in proximity to the bottom opening of the hopper, the extractor belt configured to transport the discharged mixture downstream from the bottom opening to a position beneath a plurality of coloring agent dispensing devices and then to an end zone at which the mixture freely falls from the extractor belt onto the temporary support;
    said plurality of coloring agent dispensing devices positioned above the extractor belt, in proximity to the end zone, so as to dispense at least one coloring or pigmenting agent in a non-uniform distribution onto a surface of the mixture when transported downstream by the extractor belt to the position beneath the plurality of coloring agent dispensing devices;
        wherein by free fall from the extractor belt onto said temporary support, the mixture is distributed in the form of a rough-formed slab with a layer having a predetermined thickness and resulting in the veining effect penetrating over an entirety of the predetermined thickness of the slab;
    a support structure positioned relative to the mixture metering/distributor unit; and
    a means configured for creating a relative movement between said extractor belt and said temporary support;
    wherein the plurality of coloring agent dispensing devices is fixed to said support structure and transport of the mixture via the extractor belt is over said support structure;
    wherein the support structure comprises a cross-member to which the plurality of coloring agent dispensing devices is fixed, each coloring agent dispensing device in said plurality of coloring agent dispensing devices having a nozzle for emitting a continuous or discontinuous jet of coloring agent to strike a strip of the mixture as the mixture is transported by the extractor belt so as to cover overall an entire width of the mixture;
    wherein the relative movement between said extractor belt and said temporary support results in uniform freefalling of the mixture across the entire width onto said temporary support; and
    wherein the mixture metering/distributor unit is open to the external environment and such open condition is continuous for the mixture metering/distributor unit.

13. The apparatus according to claim 12, wherein the cross-member extends transversely with respect to a direction in which the extractor belt transports the mixture.

14. The apparatus according to claim 13, wherein at least one coloring agent dispensing device in the plurality of coloring agent dispensing devices is movable along the cross-member in a controlled and adjustable manner.

15. The apparatus according to claim 13, wherein the plurality of coloring agent dispensing devices is arranged along the transverse extent of the cross-member.

16. The apparatus according to claim 15, wherein each coloring agent dispensing device in the plurality of coloring agent dispensing devices is movable along the extent of the cross-member over a limited distance, so as to ensure more correct distribution of the at least one coloring or pigmenting agent onto the surface of the mixture that is being transported downstream by the extractor belt.

17. The apparatus according to claim 5, wherein the cross-member extends transversely with respect to a direction in which the extractor belt transports the mixture.

18. The apparatus according to claim 1, wherein the temporary support is a tray mould.

* * * * *